United States Patent [19]

Gray et al.

[11] Patent Number: 5,086,495
[45] Date of Patent: Feb. 4, 1992

[54] SOLID MODELLING SYSTEM WITH LOGIC TO DISCARD REDUNDANT PRIMITIVES

[75] Inventors: Michael A. Gray; Alan R. Halbert; Stephen J. Todd, all of Winchester, England

[73] Assignee: International Business Machines Corporation, Armonk, N.Y.

[21] Appl. No.: 285,850

[22] Filed: Dec. 16, 1988

[30] Foreign Application Priority Data

Dec. 18, 1987 [GB] United Kingdom ............... 8729630

[51] Int. Cl.$^5$ ............................................. G06F 15/72
[52] U.S. Cl. ..................................... 395/120; 395/124
[58] Field of Search .............. 364/522, 518, 521, 488, 364/512, 578; 340/729, 747

[56] References Cited

U.S. PATENT DOCUMENTS

| | | | |
|---|---|---|---|
| 4,649,498 | 3/1987 | Kedem et al. | 364/518 |
| 4,694,404 | 9/1987 | Meagher | 364/518 |
| 4,809,201 | 2/1989 | Keklak | 364/518 |
| 4,816,999 | 3/1989 | Berman et al. | 364/489 |
| 4,845,651 | 7/1989 | Aizawa et al. | 364/522 |
| 4,858,149 | 8/1989 | Quarendon | 364/522 |
| 4,862,392 | 8/1989 | Steiner | 364/522 |

Primary Examiner—Gary V. Harkcom
Assistant Examiner—Raymond J. Bayer
Attorney, Agent, or Firm—Mark S. Walker; George E. Clark

[57] ABSTRACT

A solid modelling system for generating a spatial representation of an object defined by a structure having a plurality of linked nodes representing the object in terms of solid geometric primitives combined by a logical expression, which is adapted to recognize redundant primitives automatically. Bitmap generation logic (BGL) is provided for traversing at least certain of the nodes in the structure for generating a bitmap representing the part of the logical expression defined in the traversed nodes and redundant primitive logic (RPL) is provided for testing the bitmap for logical redundancies indicative of redundant geometric primitives. Each bit in the bitmap is representative of a respective one of the constituents of the primitives, a constituent being the volume formed by the intersection of primitives or their complements, and, in order to test for the redundancy of a primitive u, the RPL tests for equivalence of the corresponding utrue and ufalse constituents in the bitmap. The BGL additionally generates a table of pointers to the primitives encountered during the traversal and the RPL deletes from the table a pointer to a primitive which is found to be redundant. Node generation logic (NGL) is provided for replacing the nodes traversed by the first logic by a single truth table node which comprises the modified bitmap produced by the RPL and pointers to nodes defining the remaining primitives. Logic may also be provided for processing a relevance map indicative of geometric information in combination with the bitmap.

10 Claims, 6 Drawing Sheets

SOLID MODELLING SYSTEM WITH LOGIC TO DISCARD REDUNDANT PRIMITIVES

FIELD OF THE INVENTION

The present invention relates to a solid modelling system for generating a spatial representation of a three-dimensional solid object in which redundant parts of an object definition can be automatically identified and discarded, and more particularly to a solid modelling system implemented in digital logic.

BACKGROUND OF THE INVENTION

Objects may be represented in solid modelling systems using various techniques. One which is particularly suitable for representing solid objects is sometimes termed "Constructive Solid Geometry" (CSG). In accordance with this technique a three-dimensional (3-D) solid object is represented by a functional definition identifying the set of points which lie within the object. Typically, the object is defined by a Boolean function which returns a "true" if applied to a point within the object and returns a "false" otherwise. This technique contrasts with, for example, line drawing techniques where the edges and surfaces of an object are defined rather than its volume.

The functional definition of an object effectively defines the set of points which make up the object. The functional definition of a sphere, for example, defines the set of points lying within a given radius of a center point. Composite objects are defined by combining the functional definitions of basic solid objects, or "primitives", e.g. spheres, half-spaces (i.e. the space on one side of an infinite plane), infinite cylinders. The functional definition of a dumb-bell, for example, would comprise the functional definition of each of two spheres at different positions, the functional definition of an infinite cylinder whose axis passes through the centers of the spheres and the functional definitions of two planar half-spaces which truncate the cylinder at the spheres, the functional definitions of the spheres, the cylinder and the planar half-spaces being combined using a logical expression including set operators such as the set union and intersect operators (i.e. using set theory principles). Expressions can also include other combinatorial operators such as set subtracting operators to define, for example, a composite object with a cut-out or hole. In this way hollow composite objects can be defined by subtracting a smaller object from a larger one. Such composite objects are still "solid" within the meaning of this document because points in space can be tested against the expression defining the object to determine whether they are inside or outside the object.

A composite object formed from primitives is typically defined in terms of a structure which represents the logical expression defining the object and comprises a linked set of nodes (e.g. a tree structure) with the primitives being defined at first nodes (e.g. leaf nodes of the tree), operators being defined at second or intermediate nodes to identify the combinatorial operations to be performed to construct the object from the primitives and/or sub-objects defined at lower-order nodes in the structure and the composite object being defined at an appropriate one of the operator nodes (e.g. the root of the tree).

Once an object has been defined in this way, it can be evaluated in order to determine the inside and outside and thus the boundaries of the solid. In doing so, a representation of the object with respect to space (i.e. a spatial representation) will be created. The spatial representation could take various forms depending on the application. For example, the spatial representation could be in the form of an image of the surface or of the edges of the object. This is often desired if the solid modelling system forms or is part of a graphics system. However, the solid modelling system could form a robotics control system for modelling a robot and its surroundings and controlling the movement of the robot or for controlling a tool during the manufacture of an item. Alternatively, the spatial representation could be used to compute data such as mass properties of the object.

Irrespective of the details of the form of the spatial representation and the use to which it is put, it will be appreciated by those skilled in the art that a significant amount of calculation is needed in order to process a CSG definition of a complex object due to the large number of individual component primitives.

In some cases primitives which are redundant are incorporated in a CSG definition. A primitive is said to be "redundant" if the CSG definition can be rewritten without that primitive. This can come about when building blocks which comprise a group of primitives (e.g. a cube comprising six planar half-spaces), rather than the primitives themselves, are used to simplify the generation of a CSG definition. Alternatively, or in addition, primitives can become redundant during evaluation of an object if the boundaries of the primitives are co-extensive in a region of space (termed a voxel) being considered in the spatial subdivision process. For example, consider a step-like object modelled from two rectangular blocks of different sizes located side by side with a side of one of the blocks co-extensive in part with a side of the other one; each block being defined by a set of six planar half-spaces. Although the half-spaces defining the sides of the blocks are not redundant initially, they effectively cancel each other out where the sides of the cubes are co-extensive and are, therefore, redundant when considering the object solely in this region.

Much unnecessary processing has conventionally been done during the evaluation of a CSG object because primitives which are either redundant initially, or become redundant during the processing of the definition, are not recognized as such.

SUMMARY OF THE INVENTION

The object of the present invention is a solid modelling system for generating a spatial representation of an object defined in terms of solid geometric primitives combined by a logical expression including one or more combinatorial logical operators, which is adapted to recognize redundant primitives automatically.

In accordance with the present invention, there is provided a solid modelling system for generating a spatial representation of an object defined in terms of solid geometric primitives combined by a logical expression including one or more combinatorial logic operators, the solid modelling system comprising object definition means including a structure comprising a plurality of linked nodes including primitive nodes for the primitives and operator nodes for the operators, first logic for traversing at least certain of the nodes and for generating a bitmap representing the logical expression or the part thereof defined at the operator nodes encountered during the traversal and second logic for testing the bitmap for logical redundancies indicative of redundant geometric primitives.

In a particular example of a solid modelling system in accordance with the present invention which is described hereinafter, each bit in the bitmap is representative of a respective one of the constituents of the primitives, a constituent being the volume formed by the intersection of primitives or their complements, and, in order to test for the redundancy of a primitive u, the second logic tests for equivalence of the corresponding utrue and ufalse constituents in the bitmap.

Advantageously, the first logic additionally generates a table of pointers to the primitives encountered during the traversal and the second logic deletes from the table a pointer to a primitive which is found to be redundant. Third logic is preferably provided for replacing the nodes traversed by the first logic by a single truth table node which comprises the modified bitmap produced by the second logic and pointers to nodes defining the remaining primitives.

The particular example of a solid modelling system in accordance with the invention which is described later additionally comprises world space definition means for defining the space in which the object exists, spatial subdivision logic for subdividing world space into progressively smaller regions of space, or voxels, until voxels are created for which the spatial representation can be rendered, object simplification logic for simplifying the structure defining the object within a voxel generated by the spatial subdivision means, counting logic for counting the number of primitives remaining in the structure, or a part of a simplified structure as generated by the object simplification means and, if there are less than a predetermined number of primitives, to cause the first and second logic to process said simplified structure.

In this example, the object simplification logic comprises logic for simplifying a bitmap generated by the first logic within a voxel generated by the spatial subdivision means.

In addition, a solid modelling system as above can additionally comprise logic for processing a relevance map representative of geometric information for indicating when bits of the bitmap are determined to be irrelevant to the definition of the object within the voxel (e.g. when the associated constituents are provided to be empty within the voxel).

BRIEF DESCRIPTION OF THE DRAWING

A particular example of a solid modelling system is described in the following with reference to the accompanying drawings in which.

DESCRIPTION OF A PREFERRED EMBODIMENT OF THE INVENTION

Before describing the present invention in detail it is perhaps useful to discuss the Principles of Constructive Solid Geometry for evaluating a functional definition of an object with reference to FIGS. 1A, 1B, 2, 3, and 4.

In general terms, the evaluation of a solid model is the process of determining the inside and outside and thus the boundaries of the solid.

Figure 1A:
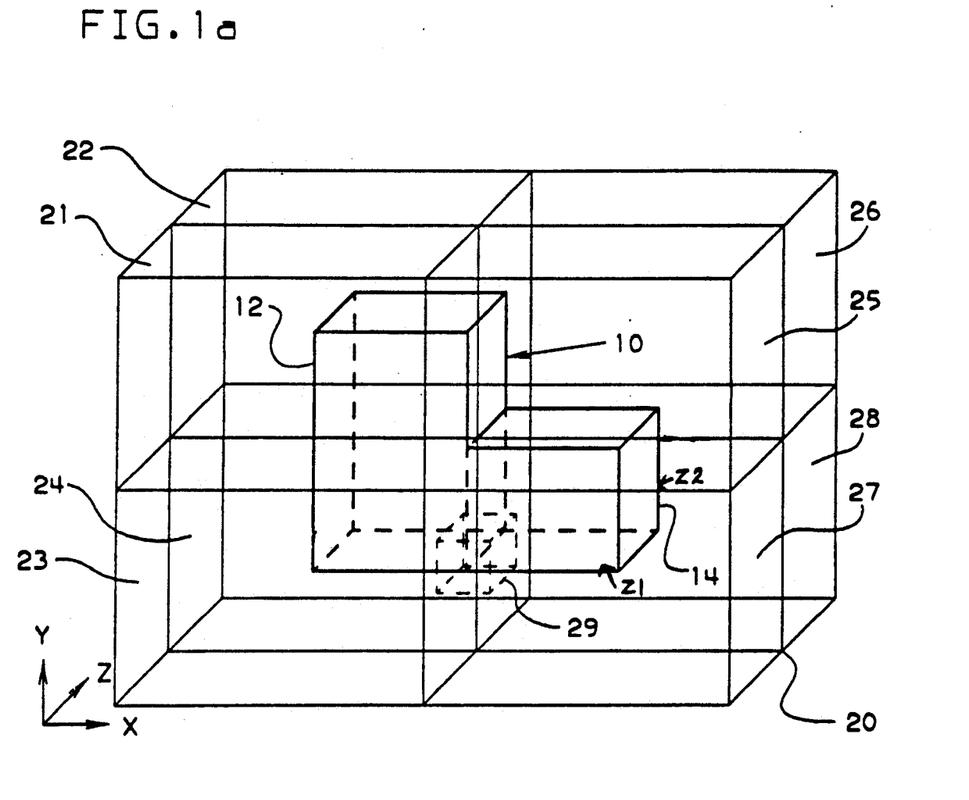
FIGS. 1A and 1B are an oblique and a cross-sectional view, respectively, of an object for illustrating the principles of CSG, both as known in the prior art and as used by the present invention.
Figure 1B:
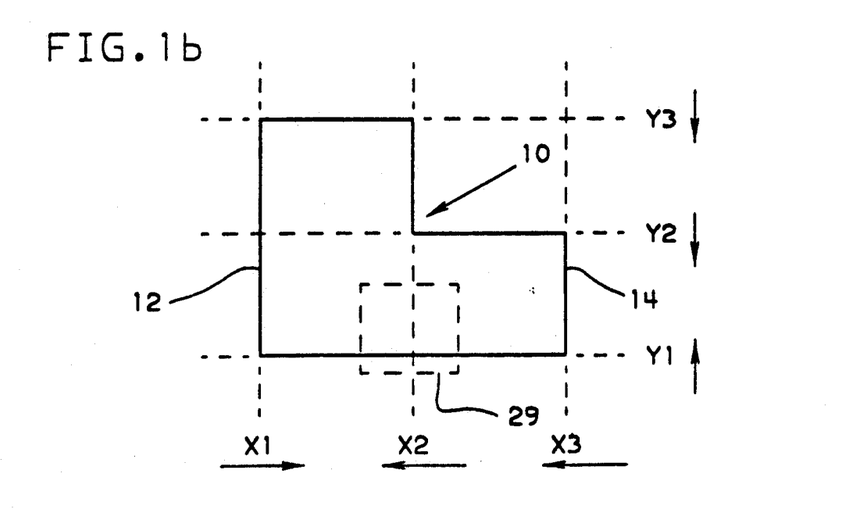

FIG. 1A is an illustration of a step-like object 10, shown within a region of space defined by a cube 20. FIG. 1B illustrates a representation of this object in the form of two touching blocks 12 and 14, shown in cross section perpendicular to the Z axis. Both of the blocks have the same depth, from a plane at Z1 to a plane at Z2, the cross section being through a plane parallel to, but intermediate, the planes at Z1 and Z2. The first block 12 is defined in terms of a logical combination of six planar half spaces X1, X2, Y1, Y3, Z1 and Z2 and the second block 14 is defined in terms of a logical combination of six planar half space $-X2$, X3, Y1, Y2, Z1 and Z2. The arrows in FIG. 1B indicate which sides of the lines shown in the figures (the lines actually represent planes seen end on) are solid. The planes referred to above and also in the following form the boundaries of planar half spaces.

Figure 2:
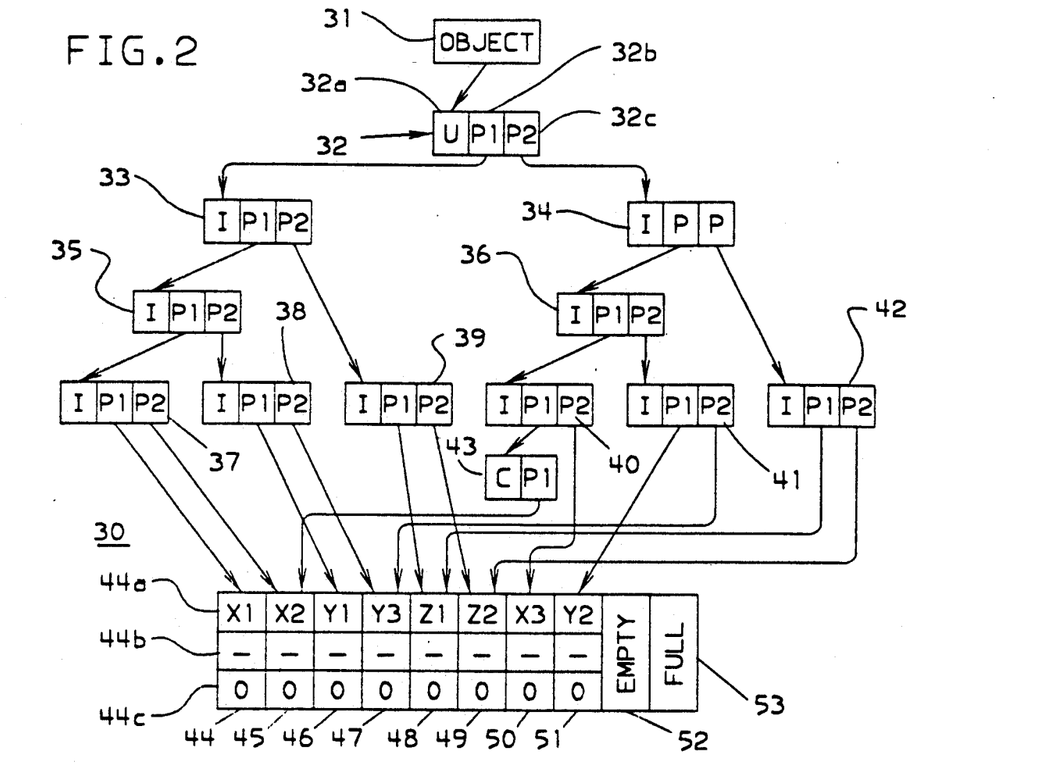
FIG. 2 is a schematic diagram of a structure for representing the object shown in FIGS. 1A and 1B in accordance with the principles of CSG.

In a conventional manner, the logical expression combining these half-spaces (i.e. the primitives) is defined in accordance with the principles of CSG by a structure such as that shown in FIG. 2. The tree-shaped structure 30 shown in FIG. 2 is formed from a linked set of nodes of different types.

The intermediate, or operator nodes 32 to 43 conventionally include a first field (e.g. 32a) defining a logical operator and one or more further fields containing pointers. As shown in FIG. 2, a second field (e.g. 32b) defines a first pointer P1 to another node and a third field (e.g. 32c), if present, defines a second pointer P2 to another node. The operators conventionally include the Boolean operators "UNION", "DIFFERENCE", "INTERSECT", SYMMETRIC DIFFERENCE" and "COMPLEMENT" operator (e.g. node 43) and two pointer fields otherwise. In FIG. 2, "U", "I" and "C" represent "UNION", "INTERSECT" and "COMPLEMENT" operators respectively.

The leaf, or primitive, nodes 44 to 51 define the primitives which make up the object. Each of the leaf nodes comprise at least a first field (e.g. 44a) containing the expression defining that primitive, a second, flag, field (e.g. 44b) and a third, results, field (e.g. 44c). In the case of a complex primitive, the first field can be large in order to be able to incorporate the definition of that primitive. The second and third fields are used by simplification logic as will be explained later. In a particular example of the present invention to be described later, the leaf nodes additionally comprise at least one other field as will be explained when describing that example. The node 31 is a pointer which is supplied to the control logic by the user program and points to the first intermediate, or root, node 32.

In order to avoid unnecessary duplication and to simplify the processing of a CSG expression, a leaf node may be pointed to by more than one of the intermediate nodes if the primitive occurs in a plurality of the subobjects defined at those intermediate nodes. If a tree is initially generated in which there may be duplicate primitive nodes, the duplication can be eliminated automatically by traversing a tree and testing for identical or complementary primitives. If identical primitives are discovered then one of the primitive nodes can be discarded and a pointer placed in each of the appropriate intermediate nodes to the retained primitive node. For example, this is the case for the primitive defined at the leaf node 45 which is pointed to by the intermediate nodes 37 and 43. If complementary primitives are detected, then the same can be done except that a COMPLEMENT node must be introduced into the structure at an appropriate position as is the case with the COMPLEMENT node 43.

Once an object has been defined in a CSG system, it is necessary to evaluate this object in order to produce a representation of the object with respect to space (i.e. a spatial representation of that object). The spatial representation could take various forms depending on the CSG application. For example, the spatial representation could be in the form of an image of the surface or of the edges of the object if the CSG system forms part of a graphics system. This image could be rendered in any conventional manner on a display screen, with a printer and so on. Alternatively, the spatial representation could form part of a robot's model of itself and its surroundings if the CSG system is incorporated in a robotics control system. In the following, the generation of a spatial representation in the form of a wireframe image for display using a display screen, printer etc. will be described, although it should be realized that the present invention is not limited to the generation and/or rendering of wire-frame images.

In general terms, the process of evaluating a CSG representation of an object comprises subdividing a region of space in which the object exists (e.g. the region 20) into progressively smaller and smaller subregions (e.g. the eight sub-regions 21 to 28 shown in FIG. 1A) and determining the relationship between the object definition and successive sub-regions until the relationship between the CSG representation and the region of space has been evaluated to an elemental level whereby the spatial distribution of the object can be determined. The solid modelling system comprises subdivision logic which is responsible for the subdivision process. The solid modelling system also comprises control logic for controlling the operation of the subdivision and other logic in the system.

As shown in FIG. 1A, the first step of subdividing the box-like region of space 20 is to divide it into 8 subregions 21, 22, 23, 24, 25, 26, 27 and 28. Subsequently, each of these sub-regions will be divided into eight further sub-regions and so on. It will be noted that the subdivision is performed in a recursive manner. A subregion will not be subdivided further if it is determined that the sub-region is FULL, EMPTY or that the part of the object within that sub-region can be rendered (i.e. reproduced) directly as will be explained below. It will be appreciated by those skilled in the art that other subdivision algorithms are possible.

During each step of the subdivision process, the structure representing the object is inspected and simplified, or "pruned", within the region or sub-region of space (hereinafter a voxel) under consideration. The simplification process is performed by simplification logic during each step in the recursive subdivision process and is itself a recursive process. In other words, the simplification logic processes the structure defining the object for a given voxel by testing the relationship between that voxel and the primitives identified in the structure and simplifying the structure where possible. The simplification logic is illustrated by means of a flow diagram in FIG. 3.

The simplification logic is called into action by the control logic of the solid modelling system in order to simplify the CSG expression for a new voxel. The control logic passes the contents of the pointer 31 (i.e. the pointer to the root node 32) as an input parameter to the simplification logic. On completion of the simplification task for that voxel, the simplification logic returns to the control logic a pointer to the first valid node of the simplified tree. Normally, the first valid node will be the root node 32.

Figure 3:
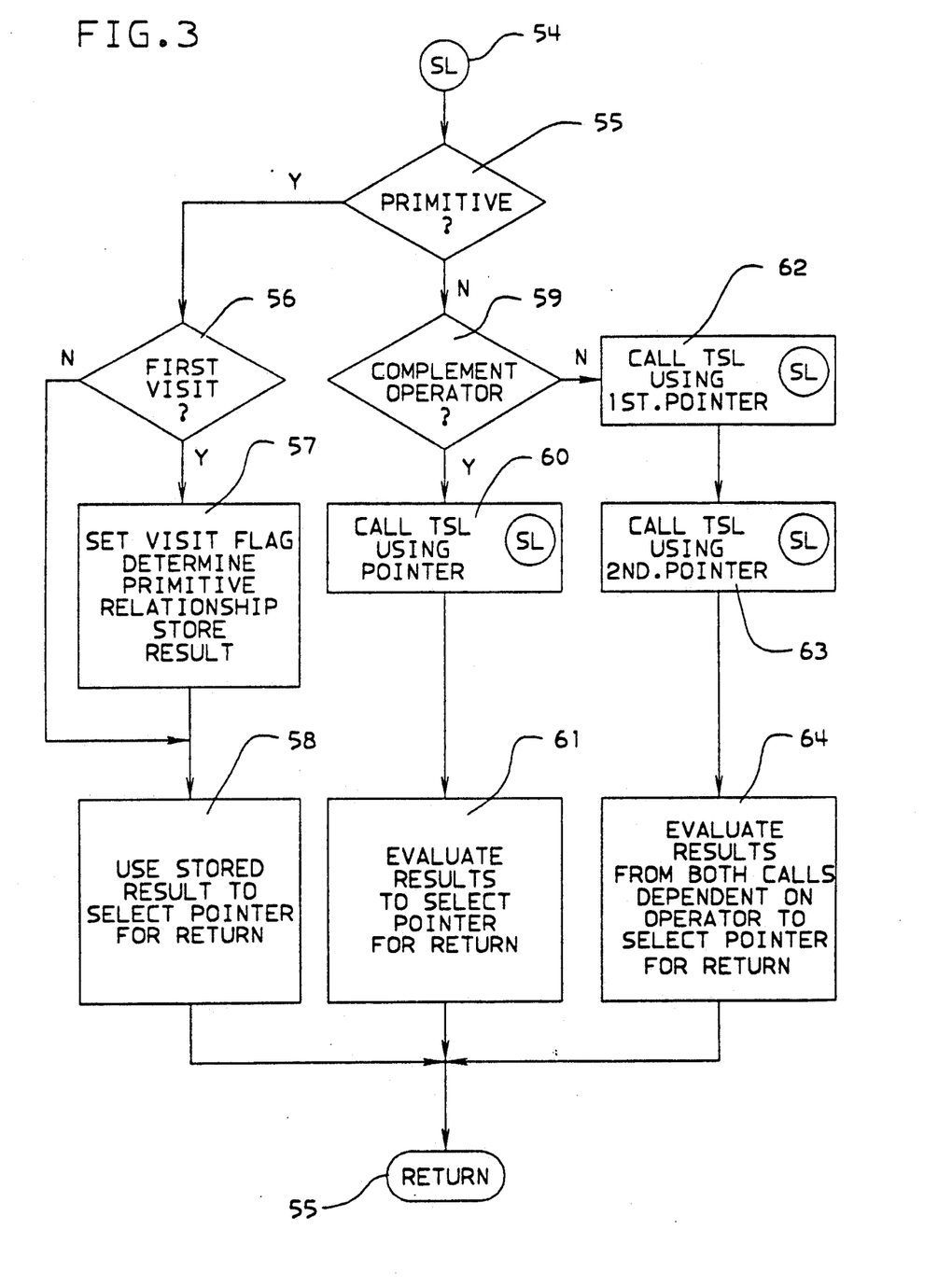
FIG. 3 is a flow diagram giving an overview of the operation of logic for simplifying the structure shown in FIG. 2.

On receiving control (at 54), the simplification logic tests (at 55) whether the node pointed to is a leaf node or not. As explained below, if the node is a leaf node, then geometric tests are performed, whereas logical tests are performed otherwise.

If it is established at 55, that the node pointed to is a leaf node, then the simplification logic tests (at 56) whether the primitive node has been visited before during the current traversal by checking whether a simplification flag has been set in the flag field of the primitive node. If the flag was not set, then the simplification logic mines the relationship between the expression for the primitive at that node and the expression for the current voxel supplied by the subdivision logic, and stores the result of the determination in the result filed of the primitive node.

The result can be one of the following possibilities: EMPTY, FULL or OTHER. The simplification flag referred to above is a number which is unique to each traversal of the structure by the simplification logic, which avoids the need to reset all the flag fields at the start of each traversal.

Then, at 58, the result stored in the result field by this or a previous visit to the primitive node by SL within the voxel is used to determine the information to be returned by this call of the simplification logic. If the primitive and the voxel do not intersect, then the result EMPTY will have been stored as the result as the definition for the voxel can effectively be replaced by the value EMPTY. Consequently, in this case a pointer to a node (e.g. node 52 in FIG. 2) containing this definition is returned by the simplification logic. If the primitive entirely contains the voxel, then the result FULL will have been stored as the expression for the voxel can effectively be replaced by the value FULL. In this case therefore, a pointer to a node (e.g. node 53 in FIG. 3) containing this definition is returned. In all other cases the primitive cannot be simplified and the result OTHER will have been stored. In such cases the pointer to the primitive node itself is returned.

If it is established at 55 that the node pointed to is an operator node, the simplification logic then test (at 59) whether the operator is a "complement" operator. If it is, the simplification logic accesses the pointer in that node to the node dependent thereon and uses that pointer for a recursive call (at 60) of the simplification logic. On return from the recursive call, the pointer returned therefrom is investigated at 61 by the simplification logic. If the pointer is to the definition "FULL", then a pointer to the definition "EMPTY" is returned by the simplification logic. If the pointer returned by the recursive call is to the definition "EMPTY", then a pointer to the definition "FULL" is returned by the simplification logic. Otherwise, the pointer to the current node (i.e. that used for the current call of the simplification logic) is returned.

If the node does not contain a "complement" operator, the simplification logic performs a first recursive call (at 62) of the simplification logic using the first, or left hand pointer to the first node dependent on the current node. On return from this first recursive call, the simplification logic stores the pointer returned from that call and then performs a second recursive call (at 63) of the simplification logic using the second, or right hand pointer to the second node dependent on the current node. On return from the second recursive call, the pointers returned by those calls are evaluated by the simplification logic at 64. If neither of the pointers returned by the recursive calls is to the definition of FULL or EMPTY, then it is not possible to simplify the node and consequently the pointer to the current node is returned by the simplification logic. If one of the pointers is to the definition of FULL or EMPTY, then simplification is possible and a different pointer from that for the current node will be returned. The simplifications for the operators UNION and INTERSECT are shown below in TABLE 1 by way of example:

TABLE 1

| 1ST POINTER | 2ND POINTER SIMPLIFICATION | POINTER RETURNED |
|---|---|---|
| EMPTY | UNION expression 2 → expression 2 | first pointer |
| expression 1 | UNION EMPTY → expression 1 | second pointer |
| FULL | UNION expression 2 → FULL | pointer to FULL |
| expression 1 | UNION FULL → FULL | pointer to FULL |
| EMPTY | INTERSECT expression 2 → EMPTY | pointer to EMPTY |
| expression 1 | INTERSECT empty → EMPTY | pointer to EMPTY |
| FULL | INTERSECT expression 2 → expression 2 | second pointer |
| expression 1 | INTERSECT FULL → expression 1 | first pointer |

In the above examples, expression 1 is the expression represented by a dependent node pointed to by the first pointer and expression 2 is the expression represented by a dependent node pointed to by the second pointer of the current node.

Figure 4:
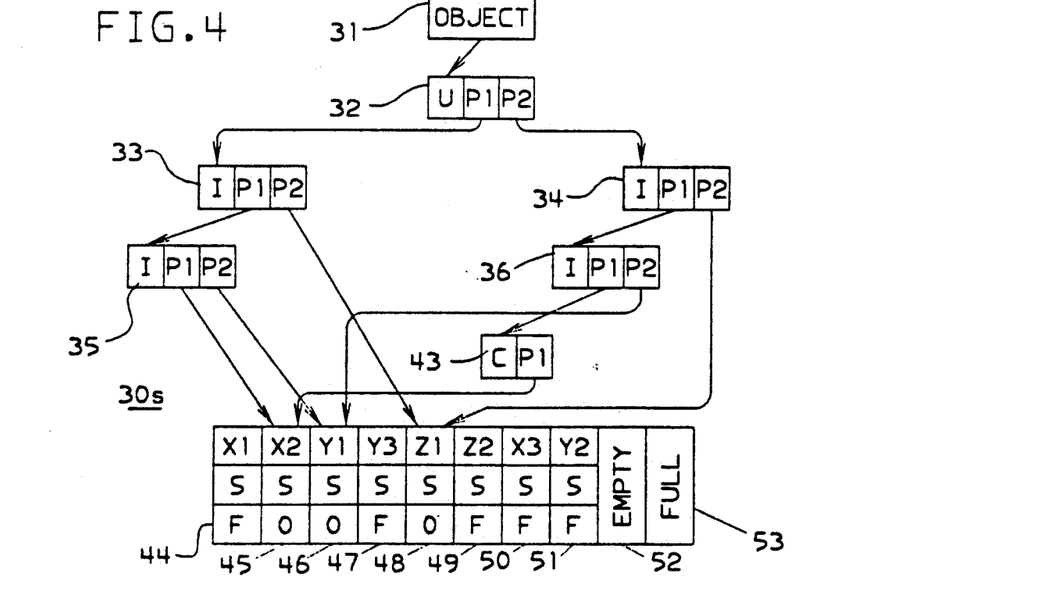
FIG. 4 is a schematic diagram of the structure of FIG. 2 when simplified by logic which operates as shown in FIG. 3.

It should be understood that a recursive call of the simplification logic will lead to yet further nested recursive calls of the simplification logic when the pointer given as input parameter for the recursive call is to an operator node. If a simplification is possible at an operator node, this means that some of the further nodes in the trees can be bypassed. FIG. 4 illustrates the tree that results from pruning the step-like object to the voxel 29 shown in FIGS. 1A and 1B. It is assumed that the plane Z1 passes through the voxel but that the voxel is totally inside the half space Z2. It will be noted that the primitives X1, X3, Y2, Y3 and Z2 which no longer contribute to the image because they are each equivalent to "FULL" within the voxel, and the intermediate nodes 37 to 42 which are redundant within the voxel have been pruned from the tree.

The simplification is not valid everywhere, however, but is equivalent to the original object within the voxel under consideration. If the result of this simplification process set out above is EMPTY, the object or subobject represented by the node being evaluated by the current call of the simplification logic does not exist within the voxel under consideration and consequently this voxel will make no contribution to the wire-frame image being generated. Similarly, if the result of the evaluation is FULL, this voxel will not contribute to the image as it is completely occupied by the object.

Eventually, some lower limit on the size of voxels will be reached. In simple terms, a stopping point is when the CSG expression is simple enough within any particular voxel to generate the spatial representation (e.g. a wire-frame rendering on a display device) by conventional means such as those described in the Article by J.R. Woodwark entitled "Generating Wireframes from Set-Theoretic Solid Models by Spatial Division", which was published in 1986 in the July/August edition of Computer Aided Design (volume 18, Number 6). It will be appreciated that the level of subdivision which is needed to enable the spatial representation (e.g. a wire-frame drawing) to be produced will vary across space in dependence upon the local complexity of the object.

As mentioned above, however, even with the simplification process set out above, it is still possible for the definition of an object to contain primitives which are redundant from the beginning or which have become redundant within a voxel at some stage in the subdivision process, with the result that unnecessary processing is performed.

Let us consider the effect of pruning the step-like object to the voxel 29 shown in FIGS. 1A and 1B, where the voxel 29 is included in the half space Z2 but intersects the plane of Z1.

The simplified structure for representing the part of the step-like object within the voxel 29 is shown in FIG. 4. For the person skilled in the art, it is possible to see by inspection of this structure that the expression represented thereby is equivalent to Y1 INTERSECT Z1 and that X2 is redundant. Although this seems relatively straight forward in the case of the structure shown in FIG. 4, the structure produced by the simplification log will, in general, be more complicated. In addition, this kind of operation is traditionally very difficult to automate on a computer. Prior solid modelling systems have processed such redundant primitives and have, as a consequence, wasted much time on ineffective processing. In addition, it has been necessary to perform a lot of pre- and post-processing in order to avoid incorrect results, for example to avoid wire-frame images of an object being cluttered with unnecessary lines.

Figures 5, 7:
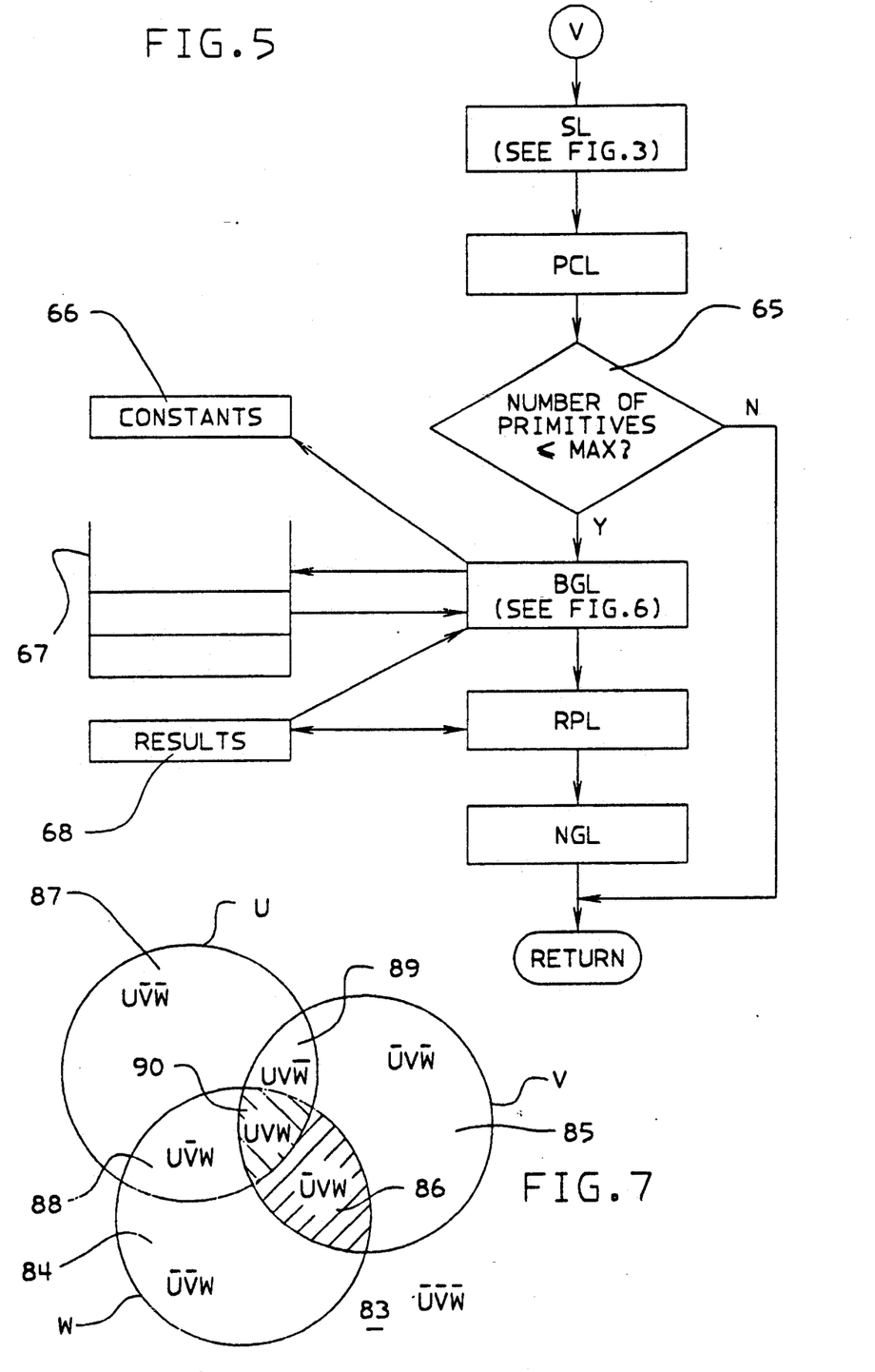
FIG. 5 is a flow diagram giving an overview of the operation of control logic in a solid modelling system in accordance with the present invention.
FIG. 7 is a Venn diagram used to explain the operation of the invention.

The aim of the present invention is to provide a solid modelling system which can automatically and efficiently recognize such redundancies. This is achieved by the provision of logic in addition to the simplification logic of FIG. 3 for processing the structure defining the object within a voxel. An overview of the logic for processing the structure in a particular example of a solid modelling system in accordance with the invention is shown in FIG. 5.

Following the operation of the simplification logic (SL), primitive counting logic (PCL) traverses the simplified structure 30S which resulted from the operation of the simplification logic and counts the number of primitives encountered. To avoid counting a primitive twice where it occurs more than once in the structure, the primitive counting logic tests whether the each primitive node has already been visited during the current traversal by checking whether a "counted" flag has been set in the flag field of the primitive node. If this flag was not set, then the primitive counting logic stores its own unique visiting card in the flag field as a "counted" flag and increments the count of primitives. The "counted" flag is chosen to be a number unique to the PCI, so that it can be differentiated from the SL visiting cards, the flag field being used by the PCL and the SL.

Figure 6:
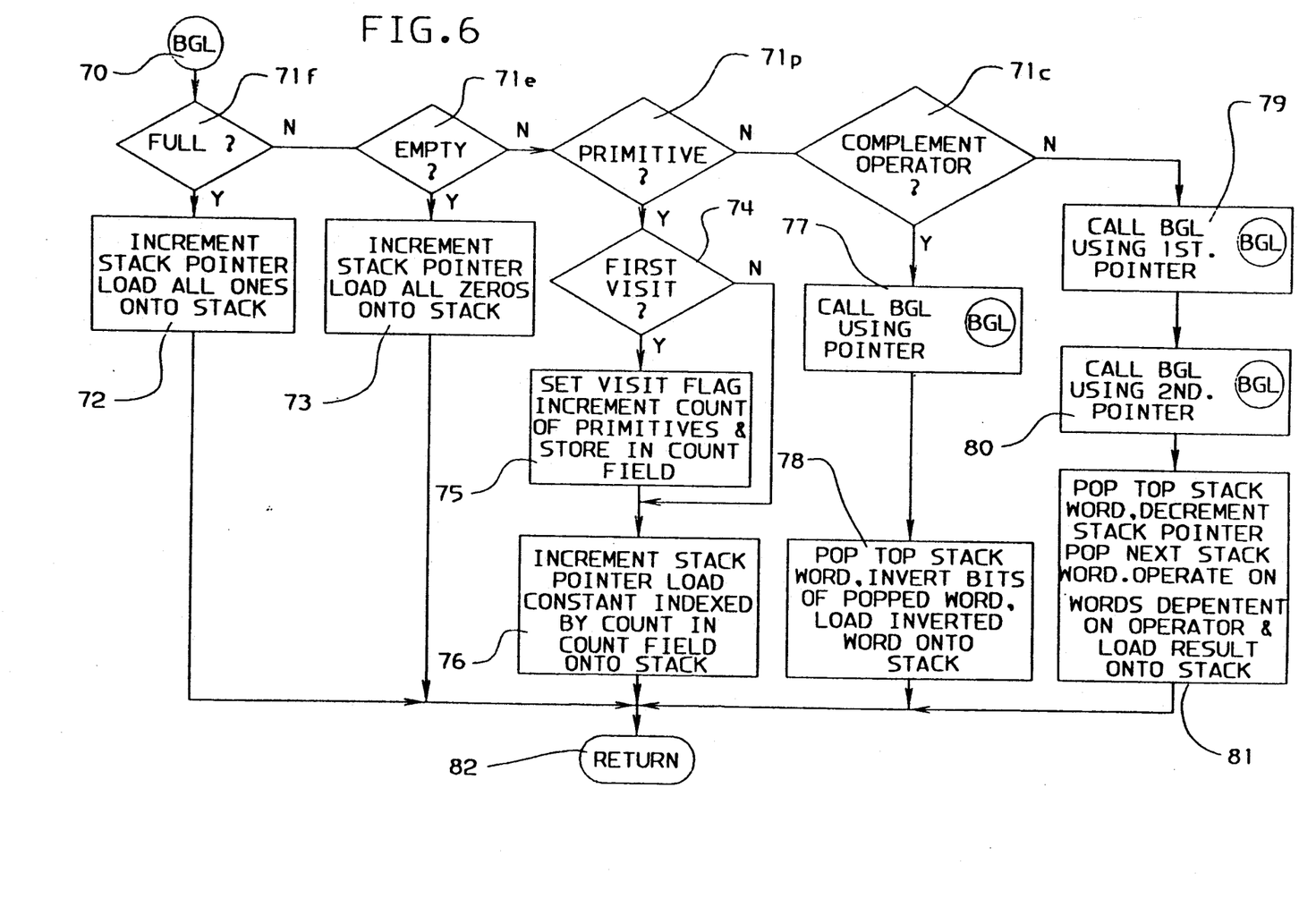
FIG. 6 is a flow diagram giving an overview of the operation of logic for generating a bitmap representing the relationship between primitives in the structure such as that shown in FIG. 4.

When the primitive counting logic has completed its traversal, if the number of primitives is found at 65 to be less than a predetermined number, the control logic calls the bitmap generation logic (BGL) which is illustrated in terms of flow diagram in FIG. 6, to traverse the structure and to establish the logical relationship between the remaining primitives in the simplified structure. The bitmap generation logic has access to a table of constants 66 containing binary words representing initial values for processing the structure, to a stack 67 for the temporary storage of intermediate values during processing, and to a results table 68 for storing pointers to primitives encountered during said processing. The initial values which are stored in the table of constants will depend on a number of factors including the number of primitives processed by the VGL. For example, if three primitives are to be processed, the initial values may be the binary words 00001111, 00110011 and 01010101 as discussed below.

The bitmap generation logic receives as input parameters at 70 a node pointer to a node of the simplified structure, a stack pointer for accessing the stack and a count of the number of primitives encountered during the traversal of the structure. It returns the stack pointer and the count of primitives as return parameters. When the control logic calls the bitmap generation logic it initializes the stack pointer, sets the node pointer to the head node of the structure or of the part thereof to be traversed and sets the primitive count to 0.

When control is received by the bitmap generation logic at 70, the form of the node pointed to by the node pointer is established at 71f, 71e, 71p and 71c and the processing of the various types of node proceeds as indicated in FIG. 6 to establish the logical relationship between the primitives in the structure.

In the particular example of a solid modelling system in accordance with the present invention to be described, the primitive nodes in the structure representing the object comprise a field in addition to the primitive definition and pointer fields described with reference to FIG. 2, namely a primitive number field. The purpose of this field will be explained later.

If the node pointed to represents FULL (i.e. if the answer is yes at 71f), the stack pointer is incremented and a binary word comprising all ones is put onto the stack at 72 and control is returned at 82. In practice, at the end of the SL processing within a voxel, all FULL and EMPTY nodes should have been eliminated from the structure. Consequently, these logic paths should not need to be used.

If the node pointed to represents a primitive (i.e. if the answer is yes at 71p), the bitmap generation logic tests at 74 whether the primitive nodes has been visited before during the current traversal by checking whether a bitmap generation logic flag has been set in the flag field in the primitive node. If the flag was not set, then the logic at 75 sets the flag using a BGL visiting card, increments the count of primitives encountered, stores the count in the primitive number field of the primitive node and stores a pointer to that node in the results table. Then, at 76, whether or not this is the first visit, the stack pointer is incremented and the number stored in the primitive number field in that node by this, or a previous encounter is used to select a binary word from the table of constants, which binary word is added to the stack at the location pointed to by the stack pointer. Control is then returned at 82 with the current stack pointer and primitive count.

If the node defines a complement operator (i.e. if the answer is yes at 71c), the pointer in that node to the node dependent thereon is selected and this is used with the current stack pointer and the current count of primitives encountered as input parameters for a recursive call at 77 of the bitmap generation logic. On return from the recursive call, the word at the top of the stack is popped and each bit in the work read out is inverted at 78. The resulting complement is then loaded back into the stack at the location pointed to by the stack pointer, also at 78, and control is returned at 82 with the current stack pointer and primitive count.

If the node defines a logical operator other than a complement operator (i.e. if the answer is no at 71c), then the bitmap generation logic performs a first recursive call of the simplification logic at 79 using the first, or left hand pointer to the first node depending on the current node and the current stack pointer and count of primitives encountered as input parameters and on return performs at 80 a second recursive call of bitmap generation logic using the second, or right hand pointer to the second node dependent thereon and the current stack pointer and count of primitives encountered as input parameters. It should be noted that the values of the stack pointer will change and the count of primitives may well change between the first and second recursive calls mentioned.

Following the return from the second recursive call, the word at the top of stack is popped, the stack pointer is decremented, the word at the new stacktop is also popped and a logical operation is performed on these two words at 81. The logical operation performed is determined by the logical operator defined at the current node. For example, if the operator is a INTERSECT operator, then the two words are logical ANDed. The result of the logical operation is loaded back onto the top of the stack. Control is then returned at 82 with the current stack pointer and primitive count.

When the structure has been traversed, the stack contains a single binary word which defines the logical expression or the part thereof defined at the operator nodes encountered during the traversal of the structure. In order to illustrate the operations performed in traversing a CSG structure, the changes in the content of the stack during the traversal of the structure illustrated in FIG. 4 are set out in TABLE 2 below.

TABLE 2

| CURRENT CALL | NODE | STACK CONTENTS | CURRENT CALL |
|---|---|---|---|
| 1 | 31→ | EMPTY | 1 |
| 2 | 32 (1)→ | " | 2 |
| 3 | 33 (1)→ | " | 3 |
| 4 | 35 (1)→ | " | 4 |
| 4R | ←45 (R) | 00001111 | 4R |
| 5 | 35 (2)→ | " | 5 |
| 5R | | 00110011 | |
| | ←46 (R) | 00001111 | 5R |
| 3R | ←35 (R) | 00000011 | 3R |
| 6 | 33 (2)→ | " | 6 |
| 6R | | 01010101 | |
| | ←48 (R) | 00000011 | 6R |
| 2R | ←33 (R) | 00000001 | 2R |
| 7 | 32 (2)→ | " | 7 |
| 8 | 34 (1)→ | " | 8 |
| 9 | 36 (1)→ | " | 9 |
| 10 | 43→ | " | 10 |
| 10R | | 00001111 | |
| | ←45 (R) | 00000001 | 10R |
| 9R | | 11110000 | |
| | ←43 (R) | 00000001 | 9R |
| 11 | 36 (2)→ | " | 11 |
| 11R | | 00110011 | |
| | | 11110000 | |
| | ←46 (R) | 00000001 | 11R |
| 8R | ←36 (R) | 00110000 | |
| | | 00000001 | 8R |
| 12 | 34 (2)→ | " | 12 |
| 12R | | 01010101 | |
| | | 00110000 | |
| | ←48 (R) | 00000001 | 12R |
| 7R | | 00010000 | |
| | ←(R) | 00000001 | 7R |
| 1R | ←32 (R) | 00010001 | 1R |

In TABLE 2 the numbers in the CURRENT CALL columns give the sequential number of the call or of the return to a call which is illustrated in a given slice of the table. The numbers and arrows in the NODES column indicate the node in FIG. 4 from which the operation represented in a given slice emanates, and the 1 or 2 or R in brackets indicates whether operation is a call using the first or second pointer or whether it is a return to an earlier call, respectively. The STACK CONTENTS column indicates the content of the stack at various stages in the process. The symbol in the stack column in a slice for a given stage in the process indicates that there has been no change in the stack contents from the immediately preceding previous stage.

It will be appreciated that a stack, or an equivalent recursive storage medium is necessary in view of the recursive nature of the process. In the present case the maximum number of elements on the stack at any one time is three, but this number could be a lot larger if the structure had more, and longer branches. As explained later, the present invention may be implemented by suitably programming a general purpose computer. In this case, if the language used for programming the computer allows the use of recursive procedural calls, then the function of the stack and the stack pointer could be provided by means of locally defined variables as will be apparent to one skilled in the art. If the use of recursive procedural calls with local variables is not possible, or if the invention is implemented at least in part using discrete logic, then the stack can be implemented in a conventional manner using stack pointers.

In order to explain the choice of the binary words for the individual primitives and the generation of the bitmaps, it is useful to refer to FIG. 7, which illustrates a Venn Diagram including three separate areas u, v and w, each of which represents a primitive. The three areas overlap to generate eight (2**3) sub-areas or constituents. Each constituent is defined as the intersection of primitives and primitive complements as illustrated in TABLE 3 below.

TABLE 3

| FIG. 7 reference numerals | Constituents for u, v and w | Corresponding values for | | | Truth Table for FIG. 4 |
|---|---|---|---|---|---|
| | | u | v | w | |
| 83 | −u INT −v INT −w | 0 | 0 | 0 | 0 |
| 84 | −u INT −v INT  w | 0 | 0 | 1 | 0 |
| 85 | −u INT  v INT −w | 0 | 1 | 0 | 0 |
| 86 | −u INT  v INT  w | 0 | 1 | 1 | 1 |
| 87 |  u INT −v INT −w | 1 | 0 | 0 | 0 |
| 88 |  u INT −v INT  w | 1 | 0 | 1 | 0 |
| 89 |  u INT  v INT −w | 1 | 1 | 0 | 0 |
| 90 |  u INT  v INT  w | 1 | 1 | 1 | 1 | where − denotes the complement of the constituent (e.g. −u=the complement of u or NOT u and INT represents the INTERSECT operator). This can be generalized for any number of primitives such that for a given number, sav n, there are 2 to the power n (2n) constituents. In order to represent all of the possible states a truth table of 2n values is necessary.

In Table 3 above, each bit in the truth table for the logical expression represented by the structure in FIG. 4 identifies the value of that logical expression for given values of u,v,w (i.e. for a given constituent), where u,v,w and the constituents have the values true (1,inside) and false (0,outside) and u is the first primitive X2, v is the second primitive Y1 and w is the third primitive Z1. Thus, it can be seen that the fourth constituent (i.e. −u INT v INT w), is inside the object as the fourth bit has the value "1", whereas the third constituent (i.e. −u INT v INT −w), is outside the object as the third bit has the "0". In FIG. 7, the hashed constituents correspond to those inside the object. The corresponding values for u, v and w indicate the truth tables for the primitive objects u, v and w respectively. The bitmap for the first primitive u consists of the values 00001111, where each bit represents the value of the primitive expression for respective ones of the constituents in the order shown in the table above. For the second primitive, v, the bitmap consists of the values 00110011, in the same order. For the third primitive, w, it consists of the values 01010101.

The values for those same constituents for the union of two expressions with truth table tt1 and tt2 (say u and v, respectively), have values represented by tt(u,v,w) OR tt2(u,v,w)—i.e. 0 for the constituents outside both of them and 1 for all the others (00111111 for u UNION v). The values for the constituents for the intersection of two expressions with truth tables tt1 and tt2 (say u and v, respectively), have values represented by tt(u,v,w) :=tt1(u,v,w) AND tt2(u,v,w)—i.e. 1 for the constituent common to both of them and 0 for all others (00000011 for u INTERSECT v). Similar expressions can be generated for the other operators.

Using this logical representation, u can be determined to be redundant in an expression under evaluation if tt(0,v,w)=tt(1,v,w) for all v,w. In other words, if the value of u does not matter, then it is redundant in the expression. The truth table tt (u,v,w) for an expression in which u is redundant can be rewritten as a truth table tt1 for an expression in v and w where tt1(u,w) :=tt(1,v,w).

In other words, evaluating the expression for a CSG object in a given voxel will indicate whether the voxel is inside or outside the CSG object. If then, on inspection of this evaluation for each primitive u and, for every u-true constituent, the expression has the same value in the corresponding u-false constituent, then primitive u is redundant in the expression within that voxel. If, however, there is an u-true constituent for which the expression has a different value in the u-false constituent, then u is not redundant in the expression within that voxel.

Figure 8:
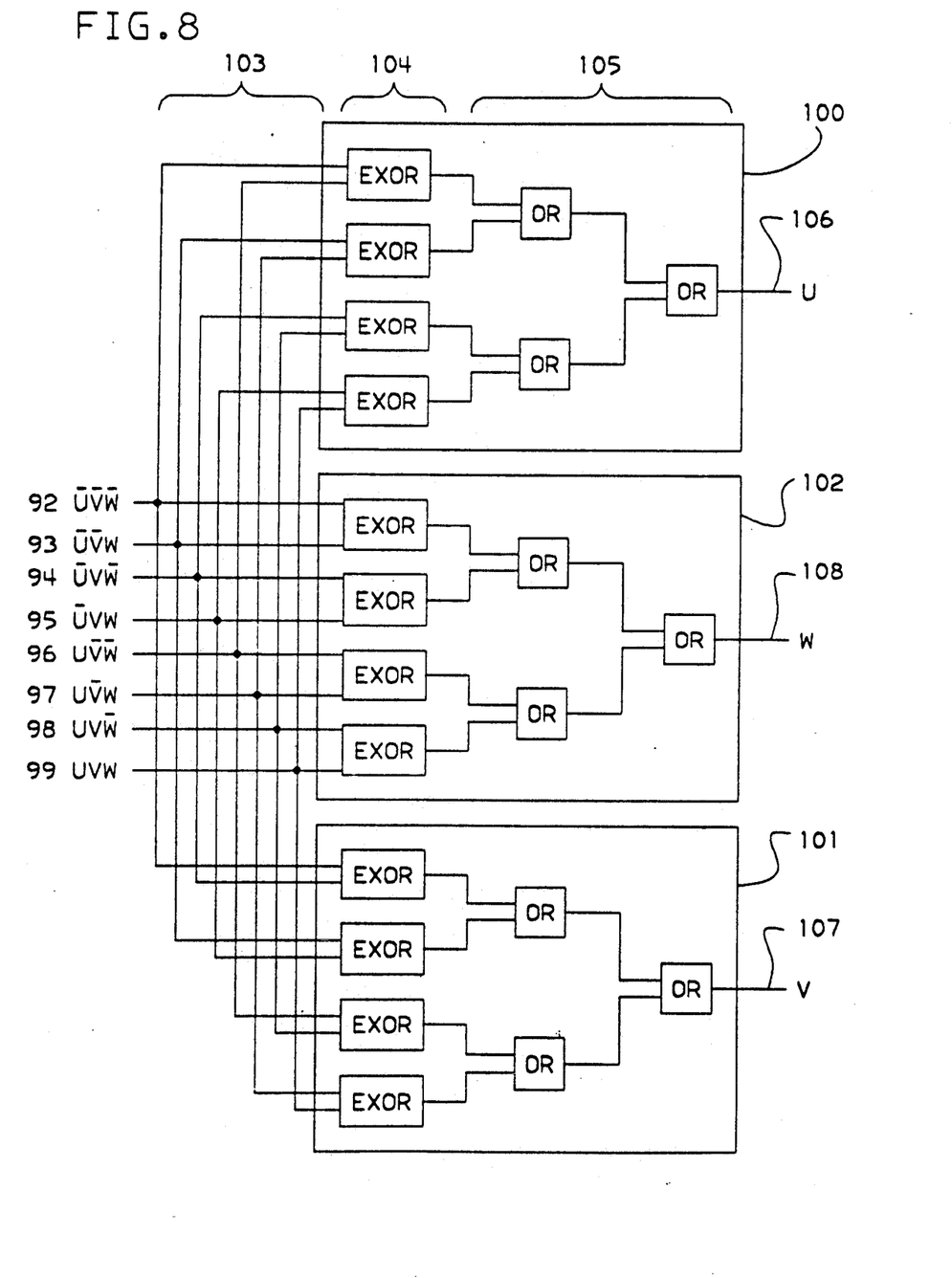
FIG. 8 is a schematic diagram of a specific implementation of part of the logic outlined in FIG. 5.

This means that it is possible to test for a primitive which is redundant in an expression by comparing true values with false values. This could be done using specially designed hardware such as that shown in FIG. 8 and described later. Alternatively, the comparison can be performed using general purpose hardware and a software algorithm which is described in the following.

In this algorithm, the comparison of true and false values is performed by shifting the truth table for the expression to the right to move values representing primitive false to the positions normally held by primitive true values, corresponding values can be compared by an exclusive-or (EXOR) function which gives ones in all mismatch positions. The shift is 4,2,1 places for the first, second and third primitives u,v,w, respectively and places irrelevant values into the positions normally holding the false values. When testing for whether a primitive is redundant, if irrelevant false positions are masked out, the result of the exclusive or will be zero if the primitive is redundant. Examples of this operation are illustrated in TABLE 4 below with respect to the truth table generated for the simplified structure shown in FIG. 4, where X2, Y1 and Z1 are the first second and third primitives (compare u, v, and w), respectively.

TABLE 4

| | |
|---|---|
| 00010001 | original bitmap |
| 00000001 | bitmap shifted right to align X2 false under X2 true |
| 00010000 | EXOR to perform comparison |
| 00001111 | mask to select only X2 true values from comparison |
| 00000000 | masked result shows all 0s, so X2 is redundant |
| 00010001 | original bitmap |
| 00000100 | bitmap shifted right to align Y1 false under Y1 true |
| 00010101 | EXOR to perform comparison |
| 00110011 | mask to select only Y1 true values for comparison |
| 00010001 | masked result includes ones, so Y1 is not redundant |

This technique can be used to simplify the bitmap which is generated by the bitmap generation logic. In order to do this the control logic passes control to redundant primitive logic (RPL) which performs shift and test operations on the bitmaps as described above. If a primitive is found to be redundant in an expression, the pointer to the primitive is removed from the table of primitives encountered and the count of remaining primitives is reduce by one.

Once the redundant primitive logic has finished the processing of the bitmap, control is passed to node generation logic (NGL) which generates a new node for the object definition structure which comprises the count of remaining primitives, the bitmap and the table of pointers to the remaining primitives. The node generation logic then replaces the structure, or the part thereof, which was traversed by the bitmap generation logic by this new node by replacing the pointers to the nodes which were traversed with a single pointer to the new node.

For reasons of ease of explanation and representation, an example with three primitives has been described, although it will be appreciated that this can be extended to any convenient number. The size of the bitmap will, however, increase rapidly with the number of primitives as the number of bits needed to represent the respective values of the constituents is $2^{}n$, where n is the number of primitives. Thus, in practice, it is convenient to limit the evaluation and generation of the truth table to a maximum number of 5, as the truth table can be generated using 32 bit words ($32=2^{}5$).

In order to prune an expression which already comprises a new node as generated by the node generation logic, the simplification logic requires logic in addition to that shown in FIG. 3. This additional logic is able to recognize such a new node and then to simplify the node. The simplification for such a node comprises the steps of performing a recursive call of the simplification logic for each of the primitives pointed to by the node and for analyzing the results of the recursive calls. For primitives that may be replaced by FULL or EMPTY, the appropriate part of the bitmap is duplicated, the original bitmap in the node is masked to select only the true (or false) positions, a left (or right) shift is per performed to make a copy with the true (or false) positions duplicated under the false (or true) positions, and the two copies are ORed together to simplify the bitmap. This operation is illustrated in TABLE 5 below.

TABLE 5

| | |
|---|---|
| 00101010 | bitmap to be pruned for v true |
| 00110011 | v true mask |
| 00100010 | v true part of bitmap (AND of above two) |
| 10001000 | copy of v true bitmap shifted left 2 to v false area |
| 10101010 | bitmap for pruned expression (OR of above two) |

In a solid modelling system as described above it is possible to eliminate automatically primitives which become redundant during the processing of an object definition structure within a voxel.

In the following, a specific further development of the above will be described for the simplification of expressions in which additional geometric information about relationships between the primitives is available. An example of such additional geometric information is that a first primitive is fully contained within another primitive in a particular voxel. Thus, the expression u union v, which is normally dependent on u and v, is in fact equivalent to u in a given voxel if the primitive is entirely contained within v (i.e. u includes v) in that voxel.

In this specific further development of the solid modelling system described above, the bitmap which is generated by the bitmap generation logic is associated with a mask, termed a relevance map or relmap, having one bit position for each constituent in the bitmap. The bitmap generation logic is modified so that, in addition to generating a bitmap, it also generates a relmap of all ones. The relmap is later refined by comparing primitives geometrically and independently of the logical structure connecting them to establish any interdependencies. This geometric information is often generated as a side effect of conventional line generation such as that discussed in J. R. Woodwark's article above. It is also generated by the simplification logic processing above (e.g. v=FULL is a piece of geometric information).

A value of 1 in a position in the relmap indicates that the associated constituent is not known to be empty and the value in the bitmap might be relevant. As more geometric information is determined at the primitive nodes by whatever means, bits are turned off in the relmap by ANDing with the existing relmap information. The bits in the relmap are ANDed together as a given position is only relevant if both contributing positions are relevant.

The RPL is also modified to process the relmap. Consider the processing of the relmap for the expression u union v mentioned above where u is entirely contained within v (i.e. u includes v):

1011 = relmap for u includes v, where the bits of the relmap correspond respectively to the constituents −uINT−v, −uINTv, uINT−v and uINTv respectively. The zero in the second position indicates that the second constituent in order, i.e. −uINTv, is known to be EMPTY.

Testing for the redundancy of primitives can be performed by shifting as before. However, the redundant primitive removal logic will need to be modified such that shifts can be applied to the bitmap and to the relmap, which is then used as a mask. The corresponding true and false bits in the bitmap are only relevant for equality testing if both are associated with bits in the relmap which indicate that they may be relevant.

The sequence illustrated in TABLE 6 below shows testing for the relevance of the primitive u in the above mentioned example.

TABLE 6

| 0111 | 1: | bitmap for u union v |
| 0001 | 2: | bitmap 1 shifted right 2 to move u false over u false over u true |
| 0110 | 3: | 1 EXOR 2 to test for equality |
| 1011 | 4: | relmap for u includes v |
| 0010 | 5: | relmap 4 shifted to move u false over u true |
| 0010 | 6: | 4 AND 5, prevents comparison unless both bits are relevant |
| 0011 | 7: | u true mask to mask out bad values shifted into u false |
| 0010 | 8: | 6 AND 7, to mask only appropriate comparison bits |
| 0010 | 9: | 3 AND 8, result includes ones, so u is not redundant |

The sequence illustrated in TABLE 7 below shows testing for the relevance of the primitive v in the above mentioned example.

TABLE 7

| 0111 | 1: | bitmap for u union v |
| 0011 | 2: | bitmap 1 shifted right 1 to move v false over v true |
| 0100 | 3: | 1 EXOR 2 to test for equality |
| 1011 | 4: | relmap for u includes v |
| 0101 | 5: | relmap 4 shifted to move v false over v true |
| 0001 | 6: | 4 AND 5, prevents comparison unless both bits are relevant |
| 0101 | 7: | v true mask to mask out bad values shifted into v false |
| 0001 | 8: | 6 AND 7, to mask only appropriate comparison bits |
| 0000 | 9: | 3 AND 8, result is all zeros, so v is redundant |

The elimination of a primitive determined to be redundant as above involves generating a result bitmap and a result relmap. The generation of the result bitmap is illustrated in steps (1) to (5) of TABLE 8 below and comprises the steps of ANDing together the bitmap (1) and the relmap (2) to generate a word (3) containing the relevant bits from the bitmap, ORing corresponding primitive false bits (4) and primitive true bits from that word which gives the result bitmap (5). The generation of the result relmap is illustrated in steps (6) to (10) of TABLE 8 and comprises the steps of ORing together the corresponding primitive true mask bits (6) and primitive false mask bits (7) in the relmap into word (8) and ANDing the word (8) with a mask (9) to remove spurious values generated by the shifting process and to form the result relmap (10).

TABLE 8

| 0111 | 1: | bitmap for u union v |
| 1011 | 2: | relmap for u includes v |
| 0011 | 3: | 1 AND 2, relevant is from bitmap |
| 0001 | 4: | 3 shifted to move v false positions over v true positions |
| 0011 | 5: | 3 OR 4, to set all 1 relevant to form result bitmap |
| 1011 | 6: | relmap for u includes v |
| 0101 | 7: | relmap 6 shifted to move v false over v true |
| 1111 | 8: | 6 OR 7, to indicate all relevant bits |
| 0101 | 9: | v true bitmap to mask off v false in relmap |
| 0101 | 10: | 8 AND 9 to give result relmap |

In essence, therefore, whereas the bitmap is used to represent logical information, the relmap is used to represent geometric information.

The sequence of steps illustrated in TABLE 8 above are chosen to take account of the fact that the removal of one primitive may cause a second no longer to be redundant. For example, in the expression A UNION B with the geometric information A=B, either A or B may be redundant, but not both. The above sequence ensures that only one, but no both of the primitives will be eliminated.

A solid modelling system in accordance with the present invention can be implemented by suitably programming a general purpose computer. In this case the logic described above can be provided by appropriate programming code and the storage elements such as the stack and the constants table and the table of pointers to primitives encountered provided by suitably configuring the system memory. A particularly advantageous implementation is possible where the logic is provided by programming the computer in a language which allows recursive procedural calls with the definition of local variables within procedures as well as global variables. In such a case each of the logic blocks shown in FIG. 5 could be implemented as a separate procedure. The present invention is not, however, limited to such an implementation and may be implemented as a special purpose processor or as a special purpose adapter for use with a general purpose computer.

In such a case, one or more of the storage elements mentioned could be provided by units of discrete storage. Similarly, the logic may well be provided wholly or in part by special purpose logic. For example, the Redundant Primitive Logic described above could be implemented by hardwired logic having the structure shown in FIG. 8. For ease of illustration, this figure gives a schematic overview of logic for comparing corresponding true and false positions in a bitmap comprising eight bits only (i.e. for three primitives). The bits of the bitmap are input to respective inputs 92 to 99. The hardwired logic shown in FIG. 8 comprises three decoder blocks, 100, 101 and 102 for determining whether or not one or more of the primitives u, v and w redundant. Each decoder block compares the appropriate primitive true and primitive false bits in the bitmap for a respective one of the primitives. The selection of the appropriate bits is performed by hardwired connections 103 and the comparisons are performed by EXOR gates 104 in each of the decoder blocks. In each decoder block, the outputs of the EXOR gates are ORed together by a network of OR gates 105 to form the output for the decoder block, respectively outputs 106, 107 and 108 for the decoder blocks 100, 101, and 102. A signal level "zero" at the output 106 of the decoder block 100 indicates that the corresponding primitive u is redundant. Similarly, signal level "zero" outputs at the outputs 107 and 108 of the decoder blocks 101 and 102 indicate that the corresponding primitives v and w, respectively are redundant. It will be apparent to the skilled person how to implement this logic for a bitmap for any given number of primitives given the teaching of this figure and the preceding description. It will also be apparent to the skilled person that the logic shown in FIG. 8 can be enhanced to provide the processing of a relmap as well.

It will be appreciated by those skilled in the art that many modifications are possible within the scope of the appended claims.

For example, whereas, in the particular example of a solid modelling system described above, the elimination of primitives from the structure during a simplification process within a voxel is achieved by replacing pointers to the primitive node by pointers to FULL/EMPTY nodes, this could be achieved using a relmap to label primitives which are eliminated.

Also it should be .that the separation of the logic into the separate blocks of FIG. 3 is for ease of explanation only and that some or all of the blocks could be combined in other examples of a solid modelling system in accordance with the present invention. In addition, the operations performed in some of the blocks of logic may be performed instead or additionally in other of the blocks of logic. For example, the simplification logic could be arranged to count the primitives remaining as it simplifies the structure, instead of, or in addition to , the counting of primitives performed in the primitive counting logic.

What is claimed is:

1. A solid modelling system for generating a spatial representation of an object defined in terms of solid geometric primitives combined by a logical expression including one or more combinatorial logical operators, comprising:
   object definition means including a structure comprising a plurality of linked nodes for said primitives and for said operators;
   first logic means for traversing at least certain of the nodes generating a table comprising a bitmap representing the logical expression or the part thereof defined at the operator nodes encountered during the traversal; and
   second logic means for testing the bitmap for logical redundancies indicative of redundant geometric primitives.

2. A solid modelling system as claimed in claim 1 wherein each bit in the bitmap is representative of a respective one of the constituents of said primitives and wherein said second logic means, in order to test for the redundancy of a primitive u, tests for the equivalence of corresponding utrue and ufalse constituent in the bitmap.

3. A solid modelling system as claimed in claim 1 wherein said first logic means additionally generates a set of pointers to the primitives encountered during the traversal and wherein the second logic deletes from the set a pointer to a primitive which is found to be redundant.

4. A solid modelling system as claimed in claim 3 additionally comprising third logic means for replacing the nodes traversed by said first logic means by a single truth table node which comprises the bitmap produced by said first logic means and the set of pointers to nodes defining the remaining primitives.

5. A solid modelling system as claimed in claim 4 which additionally comprises:
   world space definition means for defining a voxel in which the object exists;
   spatial subdivision logic means for subdividing world space into progressively smaller voxels until voxels are created for which the spatial representation can be rendered;
   object simplification logic means for simplifying the structure defining the object within a voxel generated by the spatial subdivision means by combining or eliminating primitives entirely inside or outside said voxel;
   counting logic means for counting the number of primitives remaining in the, or a part of a simplified structure as generated by the object simplification means and, if there are less than a predetermined number of primitives, to cause the first and second logic means to process said simplified structure.

6. A solid modelling system as claimed in claim 5 in which the object simplification logic means comprises: logic which, within a voxel generated by said spatial subdivision logic means simplifies the truth table node previously inserted in the structure by the third logic means.

7. A solid modelling system as claimed in claim 5, additionally comprising logic for processing a relevance map representative of geometric information for indicating when bits of the bitmap are determined to be irrelevant to the definition of the object within that voxel.

8. A solid modelling system as claimed in claim 7, wherein said second logic means deletes from the set of pointers a pointer to a primitive by modifying the relevance map.

9. A solid modelling system as claimed in claim 1 which additionally comprises:
   world space definition means for defining a voxel in which the object exists;
   spatial subdivision logic means for subdividing world space into progressively smaller voxels until voxels are created for which the spatial representation can be rendered;
   object simplification logic means for simplifying the structure defining the object within a voxel generated by the spatial subdivision means by combining or eliminating primitives entirely inside or outside said voxel;
   counting logic means for counting the number of primitives remaining in the, or a part of a simplified structure as generated by the object simplification means and, if there are less than a predetermined number of primitives, to cause the first and second logic means to process said simplified structure.

10. A solid modelling system as claimed in claim 9 additionally comprising logic for processing a relevance map representative of geometric information for indicating when bits of the bitmap are determined to be irrelevant to the definition of the object within that voxel.

* * * * *